US012584051B2

(12) United States Patent
Araki

(10) Patent No.: US 12,584,051 B2
(45) Date of Patent: Mar. 24, 2026

(54) URETHANE-BASED ADHESIVE COMPOSITION

(71) Applicant: SIKA TECHNOLOGY AG, Baar (CH)

(72) Inventor: Kiminori Araki, Kanagawa (JP)

(73) Assignee: SIKA TECHNOLOGY AG, Baar (CH)

( * ) Notice: Subject to any disclaimer, the term of this patent is extended or adjusted under 35 U.S.C. 154(b) by 878 days.

(21) Appl. No.: 17/855,181

(22) Filed: Jun. 30, 2022

(65) Prior Publication Data

US 2023/0017595 A1 Jan. 19, 2023

(30) Foreign Application Priority Data

Jul. 2, 2021 (JP) ................................ 2021-110595

(51) Int. Cl.

| | |
|---|---|
| ***C09J 175/08*** | (2006.01) |
| ***C08G 18/12*** | (2006.01) |
| ***C08G 18/48*** | (2006.01) |
| ***C08G 18/78*** | (2006.01) |
| ***C08K 3/04*** | (2006.01) |
| ***C08K 3/26*** | (2006.01) |
| ***C08K 5/12*** | (2006.01) |

(52) U.S. Cl.

CPC ............ *C09J 175/08* (2013.01); *C08G 18/12* (2013.01); *C08G 18/4812* (2013.01); *C08G 18/7831* (2013.01); *C08K 3/04* (2013.01); *C08K 3/26* (2013.01); *C08K 5/12* (2013.01); *C08G 2170/00* (2013.01); *C08K 2003/265* (2013.01); *C08K 2201/014* (2013.01); *C09J 2475/00* (2013.01)

(58) Field of Classification Search

CPC ................ C09J 175/08; C09J 2475/00; C08K 2003/265; C08K 2201/014; C08G 2170/00

See application file for complete search history.

(56) References Cited

U.S. PATENT DOCUMENTS

| | | | | |
|---|---|---|---|---|
| 6,180,713 | B1 * | 1/2001 | Araki | C08L 75/04 528/53 |
| 11,365,278 | B2 * | 6/2022 | Blodau | C08G 18/482 |
| 2006/0096694 | A1 * | 5/2006 | Zhou | C08G 18/12 252/511 |
| 2008/0099142 | A1 * | 5/2008 | Zhou | C08G 18/12 156/331.7 |
| 2016/0137815 | A1 * | 5/2016 | Araki | C08G 18/4812 524/872 |
| 2018/0086956 | A1 | 3/2018 | Araki et al. | |
| 2020/0019093 | A1 * | 1/2020 | Tsuruga | B29B 7/7461 |
| 2021/0071054 | A1 * | 3/2021 | Golombowski | C08K 9/06 |
| 2022/0025233 | A1 * | 1/2022 | Nishimura | C08G 18/809 |
| 2023/0374358 | A1 * | 11/2023 | Zhu | C08G 18/718 |
| 2024/0101880 | A1 * | 3/2024 | Tsushima | C09J 175/08 |
| 2024/0199931 | A1 * | 6/2024 | Zhu | C08G 18/12 |
| 2025/0034314 | A1 * | 1/2025 | Yang | C08G 18/4829 |

FOREIGN PATENT DOCUMENTS

| | | | | |
|---|---|---|---|---|
| JP | 2000351894 A | * | 12/2000 | |
| WO | WO 2016/159237 A1 | | 10/2016 | |
| WO | WO-2019156737 A1 | * | 8/2019 | C08G 18/10 |

OTHER PUBLICATIONS

Clarivate Analytics Machine translation of JP 2000351894 A publi8shed Dec. 19, 2000 (Year: 2000).*

* cited by examiner

*Primary Examiner* — Jane L Stanley

(74) *Attorney, Agent, or Firm* — OLIFF PLC

(57) ABSTRACT

A urethane-based adhesive composition includes a urethane prepolymer, a carbon black A having a dibutyl phthalate oil absorption number of 30 to 40 ml/100 g, a carbon black B having a dibutyl phthalate oil absorption number of 98 to 108 ml/100 g, a calcium carbonate C, a plasticizer D, a modified product E of an aliphatic diisocyanate, and a catalyst, and the urethane-based adhesive composition is configured to satisfy all of the following (1) to (6): (1) $25 \leq a \leq 35$, (2) $55 \leq b \leq 75$, (3) $197 \leq a+3b \leq 251$, (4) $30 \leq c \leq 35$, (5) $35 \leq d \leq 45$, and (6) $9 \leq e \leq 13$.

4 Claims, No Drawings

URETHANE-BASED ADHESIVE COMPOSITION

RELATED APPLICATION

This application is based upon and claims the benefit of priority from Japanese Patent Application No. 2021-110595, filed Jul. 2, 2021, the entire contents of which is incorporated herein by reference.

BACKGROUND

The present technology relates to a urethane-based adhesive composition.

RELATED ART

Conventionally, as an adhesive that can be used for automobiles, an adhesive composition containing a urethane prepolymer, a carbon black, and the like have been known (for example, International Patent Publication No. WO2016/159237).

An adhesive composition for automobiles is usually required to have excellent thermal stability during production, workability and stability during use, physical properties (initial and after-aging) of a cured product to be obtained, and the like, and in recent years, the requirement levels thereof have been increasingly high.

SUMMARY

The present inventor has prepared urethane-based adhesive compositions containing a urethane prepolymer, a carbon black, and the like with reference to International Patent Publication No. WO2016/159237, and evaluated the prepared urethane-based adhesive compositions. As a result, it has been found that there is room for improvement of the urethane-based adhesive composition for satisfying all of the above required levels.

The present technology provides a urethane-based adhesive composition having excellent thermal stability during production, workability during use, stability, physical properties (initial and after aging; the same applies hereinafter) of a cured product to be obtained, and adhesiveness.

The present inventor has found that desired effects can be achieved when a urethane-based adhesive composition contains: a urethane prepolymer; carbon blacks A and B each having a dibutyl phthalate oil absorption number in a specific range; a calcium carbonate C; a plasticizer D; a modified product E of aliphatic diisocyanate; and a catalyst, wherein respective contents of A to E are specified, and the contents of A and B satisfy a specific relationship.

The present technology is based on the above finding and the like, and specifically provides the following constitution.

[1] A urethane-based adhesive composition comprising:

a urethane prepolymer;

a carbon black A having a dibutyl phthalate oil absorption number of 30 to 40 ml/100 g;

a carbon black B having a dibutyl phthalate oil absorption number of 98 to 108 ml/100 g;

a calcium carbonate C;

a plasticizer D;

a modified product E of an aliphatic diisocyanate; and a catalyst, the urethane-based adhesive composition being configured to satisfy all of the following (1) to (6):

$$25 \leq a \leq 35 \quad (1)$$

$$55 \leq b \leq 75 \quad (2)$$

$$197 \leq a+3b \leq 251 \quad (3)$$

$$30 \leq c \leq 35 \quad (4)$$

$$35 \leq d \leq 45 \quad (5)$$

$$9 \leq e \leq 13 \quad (6)$$

where "a" in the (1) and (3) represents a content of the carbon black A with respect to 100 parts by mass of the urethane prepolymer, "b" in the (2) and (3) represents a content of the carbon black B with respect to 100 parts by mass of the urethane prepolymer, "c" in the (4) represents a content of the calcium carbonate C with respect to 100 parts by mass of the urethane prepolymer, "d" in the (5) represents a content of the plasticizer D with respect to 100 parts by mass of the urethane prepolymer, "e" in the (6) represents a content of the modified product E with respect to 100 parts by mass of the urethane prepolymer, and units of the "a" to "e" are parts by mass.

[2] The urethane-based adhesive composition according to [1], wherein the modified product E contains a biuret of hexamethylene diisocyanate and/or an isocyanurate of hexamethylene diisocyanate.

[3] The urethane-based adhesive composition according to [1], wherein the calcium carbonate C contains heavy calcium carbonate.

[4] The urethane-based adhesive composition according to [1], wherein the plasticizer D contains a phthalic acid ester and/or an adipic acid ester.

The urethane-based adhesive composition of the present technology is excellent in thermal stability during production, workability during use, stability, physical properties of a cured product to be obtained, and adhesiveness.

DETAILED DESCRIPTION

The present technology is described in detail below.

In the present specification, a numerical range represented by "(numerical value) to (numerical value)" means a range including the numerical values described before and after "to".

In the present specification, unless otherwise specified, substances corresponding to each component can be used singly or in combination of two or more kinds thereof. When a component includes two or more substances, the content of the component means the total content of the two or more substances unless otherwise specified.

In the present specification, when at least one of thermal stability during production, workability during use, stability during use, physical properties of a cured product to be obtained, and adhesiveness is more excellent, it may be said that the effect of the present technology is more excellent.

[Urethane-Based Adhesive Composition]

The urethane-based adhesive composition of the present technology (adhesive composition of the present technology) contains: a urethane prepolymer; a carbon black A having a dibutyl phthalate oil absorption number of 30 to 40 ml/100 g; a carbon black B having a dibutyl phthalate oil absorption number of 98 to 108 ml/100 g; a calcium carbonate C; a plasticizer D; a modified product E of an aliphatic diisocyanate; and a catalyst, the urethane-based adhesive composition satisfying all of the following (1) to (6):

$$25 \leq a \leq 35 \quad (1)$$

$$55 \leq b \leq 75 \quad (2)$$

$$197 \leq a+3b \leq 251 \quad (3)$$

$$30 \leq c \leq 35 \quad (4)$$

$$35 \leq d \leq 45 \quad (5)$$

$$9 \leq e \leq 13 \quad (6)$$

In the above (1) to (6), "a" represents the content of the carbon black A, "b" represents the content of the carbon black B, "c" represents the content of the calcium carbonate C, "d" represents the content of the plasticizer D, and "e" represents the content of the modified product E. The "a" is an amount (unit is part by mass) with respect to 100 parts by mass of the urethane prepolymer. The same applies to "b", "c", "d", and "e".

Hereinafter, each component contained in the adhesive composition of the present technology is described in detail.

[Urethane Prepolymer]

The urethane prepolymer contained in the adhesive composition of the present technology is not particularly limited as long as it is a urethane prepolymer having an isocyanate group. In one of preferred embodiments, the urethane prepolymer has an isocyanate group at a terminal thereof.

Meanwhile, in the present technology, the urethane prepolymer does not contain a modified product E described later.

Examples of the urethane prepolymer include those obtained by having a polyisocyanate reacted with a compound having two or more active hydrogen-containing groups in one molecule (active hydrogen compound) such that the polyisocyanate has an excessive amount of isocyanate group with respect to the active hydrogen-containing group of the active hydrogen compound.

Isocyanate Group Content

The isocyanate group content of the urethane prepolymer is preferably 0.5 to 5 mass % based on the total amount of the urethane prepolymer.

Polyisocyanate

The polyisocyanate used in the production of the urethane prepolymer is not particularly limited as long as it has two or more isocyanate groups in a molecule.

Examples of the polyisocyanate that can be used in the production of the urethane prepolymer include:

aromatic polyisocyanates such as toluene diisocyanate (TDI), diphenylmethane diisocyanate (MDI; for example, 4,4'-diphenylmethane diisocyanate, 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; and aliphatic polyisocyanates (including alicyclic polyisocyanates) such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanatomethyl) cyclohexane ($H_6XDI$), and dicyclohexylmethane diisocyanate ($H_{12}MDI$).

Among them, polyisocyanate preferably contains an aromatic polyisocyanate, and more preferably contains MDI, from the viewpoint of excellent curability.

Active Hydrogen Compound

The compound having two or more active hydrogen-containing groups in one molecule (active hydrogen compound) that can be used in the production of the urethane prepolymer is not particularly limited. Examples of the active hydrogen-containing group include a hydroxy (OH) group, an amino group, and an imino group.

Preferable examples of the active hydrogen compound include a polyol compound having two or more hydroxy (OH) groups in one molecule, and among them, a polyol compound is preferable.

The polyol compound that can be used in the production of the urethane prepolymer is not particularly limited as long as it is a compound having two or more hydroxy groups. Examples of the compound include: polyether polyols; polyester polyols; polymer polyols having a carbon-carbon bond in the main chain skeleton, such as acrylic polyols, polybutadiene diols, and hydrogenated polybutadiene polyols; low molecular weight polyhydric alcohols; and mixed polyols of these. Among them, a polyether polyol is one of preferred embodiments.

Examples of the polyether polyol include polyoxyethylene diol (polyethylene glycol), polyoxypropylene diol (polypropylene glycol: PPG), polyoxypropylene triol, an ethylene oxide/propylene oxide copolymer, polytetramethylene ether glycol (PTMEG), polytetraethylene glycol, and sorbitol-based polyol.

Preferred polyether polyols are polypropylene glycol, and polyoxypropylene triol, from the viewpoint of excellent compatibility with polyisocyanate.

The polyether polyol preferably has a weight average molecular weight of 500 to 20,000, from the viewpoint that the viscosity of the urethane prepolymer obtained by the reaction with isocyanate can have moderate fluidity at normal temperature (23° C.). In the present technology, the weight average molecular weight is a polystyrene equivalent value obtained by GPC (Gel Permeation Chromatography) (solvent: tetrahydrofuran (THF)).

The urethane prepolymer preferably contains a urethane prepolymer obtained by reacting a polyether polyol with an aromatic polyisocyanate from the viewpoint of excellent adhesiveness and excellent curability, and more preferably contains a urethane prepolymer obtained by reacting at least one selected from the group consisting of polyoxypropylene diol and polyoxypropylene triol with diphenylmethane diisocyanate.

The method for producing the urethane prepolymer is not particularly limited. For example, a urethane prepolymer can be produced by using polyisocyanate such that 1.5 to 2.5 mol of isocyanate groups react with 1 mol of active hydrogen-containing groups (for example, hydroxy groups) of the active hydrogen compound, and mixing and reacting these.

In producing the urethane prepolymer, a plasticizer D described below may be used.

[Carbon Black A]

In the present technology, the carbon black A is a carbon black having a dibutyl phthalate oil absorption number (DBP oil absorption number) of 30 to 40 ml/100 g.

By containing the carbon black A, the adhesive composition of the present technology is excellent in thermal stability during production, physical properties (for example, shear strength retention) of a cured product to be obtained, and adhesiveness.

Method for Measuring Dibutyl Phthalate Oil Absorption Number of Carbon Black

In the present technology, the dibutyl phthalate oil absorption number of a carbon black was measured in accordance with JIS (Japanese Industrial Standard) K 6217-4: 2008 "Carbon black for rubber industry-Fundamental characteristics-Part 4: Determination of oil absorption number (OAN) and oil absorption number of compressed sample (COAN)".

Preferred Examples of Carbon Black A

Examples of the carbon black A include carbon blacks of FT and MT grades having a DBP oil absorption number of 30 to 40 ml/100 g.

[Carbon Black B]

In the present technology, the carbon black B is a carbon black having a dibutyl phthalate oil absorption number (DBP oil absorption number) of 98 to 108 ml/100 g.

By containing the carbon black B, the adhesive composition of the present technology is excellent in stability during use (for example, viscosity, Δ bead (triangular bead) retention), stability during use (for example, low exothermicity of a constant flow pump), and physical properties (for example, tensile elastic modulus, elongation at break, and shear strength retention) of a cured product to be obtained.

The method for measuring dibutyl phthalate oil absorption number of the carbon black B is as described above.

Preferred Examples of Carbon Black B

Examples of the carbon black B include carbon blacks of ISAF (Intermediate Super Abrasion Furnace), HAF (High Abrasion Furnace), and HAF-LS (High Abrasion Furnace—Low Structure) grades corresponding to those having a DBP oil absorption number of 98 to 108 ml/100 g.

[Calcium Carbonate C]

The adhesive composition of the present technology contains a calcium carbonate C.

By containing a calcium carbonate C, the adhesive composition of the present technology is excellent in workability during use (for example, deep curability) and physical properties (for example, elongation at break) of a cured product to be obtained.

Preferred Examples of Calcium Carbonate C

In the present technology, the calcium carbonate C is not particularly limited. For example, conventionally known ones are exemplified.

The calcium carbonate C preferably contains heavy calcium carbonate with a view to achieving more excellent effects of the present technology.

Heavy Calcium Carbonate

Here, the heavy calcium carbonate is obtained by mechanically grinding or processing natural chalk, limestone, marble, and the like.

Surface Treatment

The calcium carbonate C may be surface-treated using, for example, a surface treatment agent such as a fatty acid ester. Further, the calcium carbonate C may be an untreated calcium carbonate which has not been surface-treated.

The calcium carbonate C preferably contains a surface-untreated calcium carbonate with a view to achieving more excellent effects of the present technology.

Cumulative 50% Particle Diameter of Calcium Carbonate

The cumulative 50% particle diameter of calcium carbonate C is preferably 1 to 10 with a view to achieving more excellent effects of the present technology. In the present technology, the cumulative 50% particle diameter of calcium carbonate was measured in accordance with JIS M 8511.

[Plasticizer D]

The plasticizer D contained in the adhesive composition of the present technology is not particularly limited as long as the plasticizer D can plasticize or soften the urethane prepolymer, and is a compound which is compatible with the urethane prepolymer and has no reactivity.

By containing the plasticizer D, the adhesive composition of the present technology is excellent in thermal stability during production, workability and stability during use, and physical properties of a cured product to be obtained.

Examples of the plasticizer D include phthalic acid esters; adipic acid esters; diethylene glycol dibenzoate, pentaerythritol ester; and butyl oleate.

Preferred Examples of Plasticizer D

With a view to achieving more excellent effects of the present technology, the plasticizer D preferably contains a phthalic acid ester and/or an adipic acid ester, more preferably contains a phthalic acid diester and/or an adipic acid diester, and still more preferably contains a phthalic acid diester and an adipic acid diester.

Examples of the phthalic acid diester include phthalic acid dialkyl esters such as diisononyl phthalate (DINP).

Examples of the adipic acid diester include adipic acid dialkyl esters such as dioctyl adipate and diisononyl adipate (DINA).

When the plasticizer D contains a phthalic acid ester and/or an adipic acid ester, the content of the phthalic acid ester and/or the adipic acid ester (when the phthalic acid ester and the adipic acid ester are used in combination, the total content thereof) is preferably 80 to 100 mass % and more preferably 90 to 100 mass % with respect to the total amount of the plasticizer D, with a view to achieving more excellent effects of the present technology.

The plasticizer D may be used in producing the urethane prepolymer described above, and in this case, the urethane prepolymer may be a mixture with the plasticizer D.

In addition, the plasticizer D may be added to the urethane prepolymer having been produced as described above (the urethane prepolymer may be a mixture with a part of the plasticizer D).

A portion of the plasticizer D may be added to the catalyst described below so that the catalyst is used in a state of a mixture of the catalyst and the plasticizer.

[Modified Product E]

The modified product E contained in the adhesive composition of the present technology is a modified product composed of an aliphatic diisocyanate.

By containing the modified product E, the adhesive composition of the present technology is excellent in thermal stability during production, workability and stability during use, and physical properties of a cured product to be obtained, and adhesiveness.

Isocyanate Group

With a view to achieving more excellent effects of the present technology, the modified product E preferably has an isocyanate group derived from an aliphatic diisocyanate, more preferably has a plurality of isocyanate groups per molecule, and still more preferably has 3 to 6 isocyanate groups per molecule.

When two or more aliphatic diisocyanates constitute one molecule of the modified product E, the aliphatic diisocyanates may be the same or a combination of different compounds. In one of preferred embodiments, the three aliphatic diisocyanates are the same.

The modified product E preferably contains a trimer of an aliphatic diisocyanate with a view to achieving more excellent effects of the present technology.

SPECIFIC EXAMPLES

Examples of the modified product E include a reactant of a tri- or higher functional polyol and an aliphatic diisocyanate, an allophanate of an aliphatic diisocyanate, a trimer of an aliphatic diisocyanate derived from an allophanate of an aliphatic diisocyanate, and an isocyanurate of an aliphatic diisocyanate (a nurate, that is, a trimer of an aliphatic diisocyanate), and a biuret of an aliphatic diisocyanate (a trimer of an aliphatic diisocyanate).

With a view to achieving more excellent effects of the present technology, the modified product E preferably contains at least one selected from the group consisting of: a reactant of a tri- or higher functional polyol and an aliphatic diisocyanate; a trimer of an aliphatic diisocyanate derived from an allophanate of an aliphatic diisocyanate; an isocyanurate (nurate) of an aliphatic diisocyanate, and a biuret of an aliphatic diisocyanate.

It is more preferable that the modified product E contains an isocyanurate (nurate) of an aliphatic diisocyanate, and/or a biuret of an aliphatic diisocyanate.

It is further preferable that the modified product E contains an isocyanurate of HDI and/or a biuret of HDI.

It is particularly preferable that the modified product E contains a biuret of HDI.

The aliphatic diisocyanate that can constitute the modified product E is not particularly limited as long as it is an aliphatic hydrocarbon compound having two isocyanate groups in one molecule.

Examples of the aliphatic diisocyanate include aliphatic diisocyanates (including alicyclic ones) such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanatomethyl) cyclohexane ($H_6XDI$), and dicyclohexylmethane diisocyanate ($H_{12}MDI$).

Among them, the aliphatic diisocyanate that can constitute the modified product E is preferably a linear aliphatic diisocyanate, and more preferably HDI, with a view to achieving more excellent effects of the present technology.

The modified product E preferably contains a trifunctional (having three isocyanate groups) compound (EE) obtained by modifying hexamethylene diisocyanate (HDI) with a view to achieving more excellent effects of the present technology.

Examples of the trifunctional compound (EE) obtained by modifying hexamethylene diisocyanate include reactants of a trifunctional polyol such as trimethylolpropane (TMP) and glycerol with hexamethylene diisocyanate;

an isocyanurate of hexamethylene diisocyanate (nurate); and a biuret of hexamethylene diisocyanate.

Reactant of Trifunctional Polyol and Hexamethylene Diisocyanate

Examples of the reactant of a trifunctional polyol and hexamethylene diisocyanate include a reactant of TMP and HDI (for example, a compound represented by the following formula (5)), and a reactant of glycerol and HDI (for example, a compound represented by the following formula (6)).

(5)

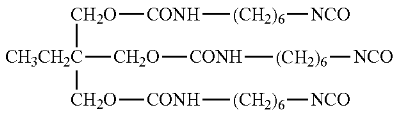

-continued (6)

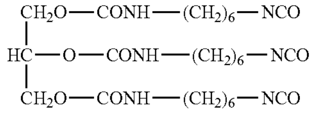

Trimer of HDI Derived from Allophanate of Hexamethylene Diisocyanate

The trimer of HDI derived from an allophanate of hexamethylene diisocyanate is not particularly limited.

Biuret of Hexamethylene Diisocyanate.

Examples of the biuret of hexamethylene diisocyanate include a compound represented by the following formula (7).

(7)

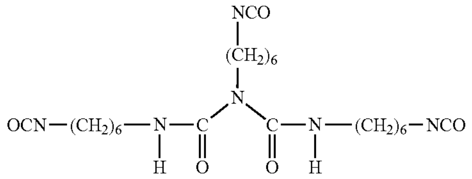

Isocyanurate of Hexamethylene Diisocyanate

Examples of the isocyanurate (nurate) of hexamethylene diisocyanate include a compound represented by the following formula (8).

(8)

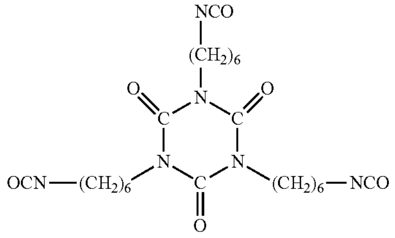

[Catalyst]

The catalyst contained in the adhesive composition of the present technology is not particularly limited as long as it is a compound capable of promoting the reaction of isocyanate groups. Examples thereof include metal catalysts and amine catalysts.

The content of the catalyst preferably (when the catalyst is a combination of two or more kinds, the total content thereof) is 0.01 to 5.0 parts by mass with respect to 100 parts by mass of the urethane prepolymer, with a view to achieving more excellent effects of the present technology and excellent moisture curability.

Metal Catalyst

The metal catalyst that can be contained in the adhesive composition of the present technology is not particularly limited as long as it is a metal compound capable of accelerating the reaction of the isocyanate group. Examples thereof include organometallic catalysts.

Examples of the metal of the metal catalyst include tin, bismuth, and titanium.

The organic group of the organometallic catalyst is not particularly limited. Examples of the organometallic catalyst include metal carboxylates, alkoxides, and complexes. The organometallic catalyst can have, for example, at least one selected from the group consisting of a carboxylic acid, an alkoxy group, and a ligand. The carboxylic acid, the alkoxy group, and the ligand are not particularly limited.

Organotin Catalyst

The metal catalyst preferably contains an organotin catalyst.

Examples of the organotin catalyst include carboxylates of tetravalent tin such as dioctyltin dilaurate, dibutyltin dilaurate, dibutyltin maleate, stannous octoate, dibutyltin diacetylacetonate, and dioctyltin maleate; organic compounds of divalent tin; and reactants of 1,3-diacetoxy-1,1,3,3-tetrabutyl-distanoxane and ethyl silicate.

Organic Titanium Catalyst

Examples of the organic titanium catalyst include tetrapropyl titanate, tetrabutyl titanate, tetraoctyl titanate, and titanium diisopropoxy bis(ethyl acetoacetate).

Content of Metal Catalyst

The content of the metal catalyst is preferably 0.0003 to 0.04 parts by mass, more preferably 0.0004 to 0.03 parts by mass, and still more preferably 0.005 to 0.02 parts by mass with respect to 100 parts by mass of the urethane prepolymer with a view to achieving more excellent effects of the present technology.

Amine Catalyst

An amine catalyst that can be contained in the adhesive composition of the present technology is a compound that contains a nitrogen atom and promotes the reaction of isocyanate groups.

Amine Catalyst Having Tertiary Amino Group

The amine catalyst preferably has a tertiary amino group (one nitrogen atom is single-bonded to three carbon atoms, or one nitrogen atom is single-bonded to one carbon atom and is double-bonded to another carbon atom).

Examples of the amine catalyst (tertiary amine) having a tertiary amino group include: tertiary amines (excluding compounds having an ether bond), such as trimethylamine, triethylamine, tripropylamine, tributylamine, triamylamine, trihexylamine, trioctylamine, trilaurylamine, dimethylethylamine, dimethylpropylamine, dimethylbutylamine, dimethylamylamine, dimethylhexylamine, dimethylcyclohexylamine, dimethyloctylamine, dimethyllaurylamine, triallylamine, tetramethylethylenediamine, triethylenediamine, N,N-dimethylbenzylamine, pyridine, methylpyridine (picoline), dimethylaminomethylphenol, trisdimethylaminomethylphenol, 1,8-diazabicyclo[5.4.0]undecene, 1,1,4-diazabicyclo[2.2.2]octane, triethanolamine, N,N'-dimethylpiperazine, and tetramethylbutanediamine; and tertiary amines having an ether bond.

Examples of the tertiary amine having an ether bond include tertiary amine having a chain ether structure such as bis(dimethylaminoethyl)ether (tertiary amine having a chain ether structure does not have a ring structure); monomorpholine compounds such as N-methylmorpholine and dimethylaminoethylmorpholine; and compounds in which a plurality of morpholine rings are bonded via ether bonds.

Examples of the compound in which a plurality of morpholine rings are bonded via ether bonds include bis(morpholinoalkyl)ethers. In the bis(morpholinoalkyl)ethers, the alkylene group between the nitrogen atom of each morpholine ring and the oxygen atom constituting the ether bond (excluding the oxygen atom of the morpholine ring) is not particularly limited. Examples thereof include an ethylene group.

Bis(Morpholinoalkyl)Ether Structure

The bis(morpholinoalkyl)ethers preferably include a bis(morpholinoalkyl)ether structure with a view to achieving more excellent effects of the present technology and excellent moisture curability.

In the bis(morpholinoalkyl)ether structure, the hydrogen atom of the morpholine ring may be substituted with a substituent. The substituent is not particularly limited. Examples thereof include an alkyl group. Examples of the alkyl group include a methyl group and an ethyl group.

Examples of the bis(morpholinoalkyl)ether include compounds represented by the following formula (1).

(1)

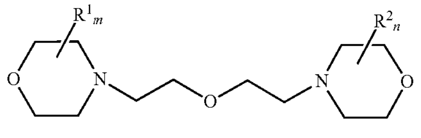

In the above formula (1), $R^1$ and $R^2$ are each independently an alkyl group, and m and n are each independently 0, 1, or 2.

Specific examples of the bis(morpholinoalkyl)ether include bis(2-morpholinoethyl)ether (the following structure), bis(methylmorpholinoethyl)ether, and bis(dimethylmorpholinoethyl)ether.

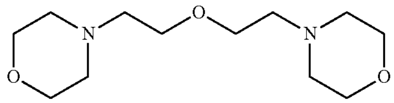 [SMILES: C1CN(CCOCCN2CCOCC2)CCO1]

With a view to achieving more excellent effects of the present technology and excellent moisture curability, the catalyst preferably contains a tetravalent tin carboxylate; a tertiary amine having a chain ether structure (having no ring structure); a monomorpholine compound; and a compound in which a plurality of morpholine rings are bonded via ether bonds.

The catalyst more preferably contains dioctyltin dilaurate, bis(dimethylaminoethyl)ether, dimethylaminoethyl morpholine, and bis(2-morpholinoethyl)ether.

Content of Amine Catalyst

The content of the amine catalyst (when two or more kinds of the amine catalysts are used, the total content of the two or more kinds of the amine catalysts) is preferably 0.01 to 1.0 parts by mass, more preferably 0.02 to 0.8 parts by mass, and still more preferably 0.08 to 0.4 parts by mass with respect to 100 parts by mass of the urethane prepolymer, with a view to achieving more excellent effects of the present technology and excellent moisture curability.

When two or more kinds of the amine catalysts are used, the total content of the two or more kinds of amine catalysts is preferably 0.04 to 5.0 parts by mass with respect to 100 parts by mass of the urethane prepolymer, with a view to achieving more excellent effects of the present technology and excellent moisture curability.

[(1)]

The adhesive composition of the present technology satisfies the following formula (1):

$$25 \leq a \leq 35 \qquad (1)$$

In the above formula (1), "a" represents the content of the carbon black A with respect to 100 parts by mass of the urethane prepolymer.

In the present specification, "a" may be referred to as a "content a". The same applies to "b" to "e". In the present technology, the units of "a" to "e" are parts by mass.

The content a is preferably 28 to 34 parts by mass with respect to 100 parts by mass of the urethane prepolymer with a view to achieving more excellent effects of the present technology.

[(2)]

The adhesive composition of the present technology satisfies the following formula (2):

$$55 \le b \le 75 \quad (2)$$

In the above formula (2), "b" represents the content of the carbon black B with respect to 100 parts by mass of the urethane prepolymer.

The content b is preferably 59 to 70 parts by mass, and more preferably 60 to 65 parts by mass with respect to 100 parts by mass of the urethane prepolymer, with a view to achieving more excellent effects of the present technology.

[(3)]

The adhesive composition of the present technology satisfies the following formula (3):

$$197 \le a+3b \le 251 \quad (3)$$

In the above formula (3), "a" represents the content a, and "b" represents the content b.

"a+3b" is preferably 205 to 240, and more preferably 210 to 229, with a view to achieving more excellent effects of the present technology.

[(4)]

The adhesive composition of the present technology satisfies the following formula (4):

$$30 \le c \le 35 \quad (4)$$

In the above formula (4), "c" represents the content of the calcium carbonate C with respect to 100 parts by mass of the urethane prepolymer.

[(5)]

The adhesive composition of the present technology satisfies the following formula (5):

$$35 \le d \le 45 \quad (5)$$

In the above formula (5), "d" represents the content of the plasticizer D with respect to 100 parts by mass of the urethane prepolymer.

[(6)]

The adhesive composition of the present technology satisfies the following formula (6):

$$9 \le e \le 13 \quad (6)$$

In the above formula (6), "e" represents the content of the modified product E with respect to 100 parts by mass of the urethane prepolymer.

The content e is preferably 10 to 12 parts by mass with respect to 100 parts by mass of the urethane prepolymer with a view to achieving more excellent effects of the present technology.

(Additive)

The adhesive composition of the present technology may further contain an additive as necessary as long as the object of the present technology is not impaired. Examples of the additive include fillers other than the carbon blacks A and B and the calcium carbonate C; isocyanate compounds other than the urethane prepolymer and the modified product E; antiaging agents; antioxidants; thixotropy-imparting agents; ultraviolet absorbers; flame retardants; surfactants; dispersants; dehydrating agents; and heat stabilizers such as diethyl malonate.

(Production Method)

The method for producing the adhesive composition of the present technology is not particularly limited. For example, the urethane prepolymer, the carbon blacks A and B, the calcium carbonate C, the plasticizer D, the modified product E, the catalyst, and additives that can be used as necessary may be stirred and mixed using a roll, a kneader, an extruder, a universal stirrer, a continuous mixer, or the like, under conditions of room temperature or heating (for example, 40 to 60° C.), whereby the adhesive composition of the present technology can be produced.

One-Pack Moisture-Curing Type

In one of preferred embodiments, the adhesive composition of the present technology is a one-pack type.

The adhesive composition of the present technology is moisture curable. For example, it can cure under conditions of −20 to +50° C. by moisture in the atmosphere.

Adherend

The adherend to which the adhesive composition of the present technology can be applied is not particularly limited. Examples thereof include metals (including coated plates), plastics, rubbers, and glasses.

The adhesive composition of the present technology can be applied to an adherend without using a primer for the adherend. Examples of the adherend not using a primer include a coated plate.

The coated plate is not particularly limited. For example, conventionally known ones can be exemplified. The coating used for the coated plate is not particularly limited.

When the adhesive composition of the present technology is used in a direct glazing method for bonding a window glass and a body (coated plate) of an automobile, the adhesive composition of the present technology can be directly applied to the body without using a primer for the body. A primer may be used on the glass. The primer used for the adherend is not particularly limited.

When the adhesive composition of the present technology is used, a pump used for feeding the adhesive composition of the present technology is not particularly limited. Examples of the pump include an internal-gear-type pump (specifically, for example, a pump generally referred to as a trochoid pump) in which an external gear and an internal gear mesh with each other and rotate. Examples of a commercially available pump include Trochoid (registered trademark) Pump (produced by Nippon Oil Pump Co., Ltd.).

EXAMPLES

Hereinafter, the present technology is specifically described with reference to Examples. However, the present technology is not limited to Examples.

(Preparation of Urethane Prepolymer 1*)

Polyoxypropylene diol (weight average molecular weight: 2000, EXCENOL 2020, produced by AGC Chemicals), 800 g, polyoxypropylene triol (weight average molecular weight 4000, EXCENOL 4030 (produced by AGC Chemicals), 1000 g, and 4,4'-diphenylmethane diisocyanate (molecular weight: 250), 350 g were mixed (NCO/OH (molar ratio)=1.8 at this time), and diisononyl adipate (DINA), 700 g, was further added, and the mixture was stirred at 80° C. for 24 hours in a nitrogen stream and reacted to synthesize a urethane prepolymer 1 containing 1.70 mass % of isocyanate groups, whereby a mixture of the urethane prepolymer 1 and diisononyl adipate as a plasticizer was obtained.

In the mixture, the content as a ratio of diisononyl adipate was 33 parts by mass with respect to 100 parts by mass of the net urethane prepolymer 1.

When the urethane prepolymer 1 is used as the urethane prepolymer, the diisononyl adipate used for preparing the urethane prepolymer 1 is incorporated in the "Plasticizer D1" row in Table 1, and diisononyl adipate associated with the urethane prepolymer 1 accounts for 33 parts by mass in each value in the "Total amount of plasticizers (D)", while the rest is the plasticizer D added to the urethane prepolymer having been produced, for example.

For the urethane prepolymer 1 used in Example 27, a urethane prepolymer was prepared in a similar manner to that described above in (Preparation of urethane prepolymer 1*) except that 700 g of diisononyl phthalate (DINP) was used in place of 700 g of diisononyl adipate (DINA) so that the urethane prepolymer 1 containing 1.70 mass % of isocyanate groups was synthesized, and a mixture of the urethane prepolymer 1 and diisononyl phthalate as a plasticizer was obtained.

In the mixture, the content as a ratio of diisononyl phthalate was 33 parts by mass with respect to 100 parts by mass of the net urethane prepolymer 1.

For the urethane prepolymer 1 used in Comparative Example 11, a urethane prepolymer was prepared as described in (Preparation of Urethane Prepolymer 1*) above, and then diisononyl adipate was removed from the resulting mixture so that the content of diisononyl adipate was 27 parts by mass with respect to 100 parts by mass of the net urethane prepolymer 1.

<Production of Adhesive Composition>

Components in Table 1 shown below were used in a formulation (part(s) by mass) shown in the same table, and these were mixed with a continuous mixer (continuous kneader produced by Dalton Corporation) to produce each adhesive composition.

In each of the tables shown below, DBP represents a dibutyl phthalate oil absorption number, and its unit is ml/100 g ($cm^3$/100 g).

In each Table, the amount of the urethane prepolymer is the net amount of the urethane prepolymer.

[Evaluation]

Each adhesive composition produced as described above was evaluated as follows. The results are shown in Table 1.

[Thermal Stability During Production: Heat Generation During Mixing]

As described above, the components in Table 1 were used in the formulation (part(s) by mass) shown in the same table, and the temperature of the mixture when these components were mixed at a mixing rate of 4 L/min by the aforementioned continuous mixer was measured.

Evaluation Criteria for Thermal Stability During Production

When the temperature measured as described above was 100° C. or lower, the adhesive composition was evaluated to have excellent thermal stability during production, and this was indicated as "o".

On the other hand, when the temperature measured as described above was over 100° C., the adhesive composition was evaluated to have poor thermal stability during production, and this was indicated as "x".

The above results are shown in the row of "Heat generation during mixing".

[Workability During Use]

Evaluation Criteria of Workability During Use

In the present technology, when the viscosity to be described below was 55 to 85 and the evaluation results of the triangular bead retention, the deep curability, and the foaming property during curing were all ○, the adhesive composition was evaluated to have excellent workability during use.

On the other hand, when the viscosity was less than 55 or over 85, or when any of the evaluation results of the triangular bead retention, the deep curability, and the foaming property during curing was x, the adhesive composition was evaluated to have poor workability during use.

(Viscosity)

The SOD viscosity (initial viscosity) of each adhesive composition produced as described above was measured using a pressure viscometer (ASTM D 1092) under the condition of 23° C. in accordance with JASO M338-89.

The measurement results are shown in the row of "Viscosity".

Evaluation Criteria of Viscosity

When the viscosity measured as described above was 55 to 85, the viscosity of the obtained composition was evaluated to be in an appropriate range.

When the viscosity measured as described above was less than 55 or over 85, the viscosity of the obtained composition was evaluated not to be in an appropriate range.

[Triangular Bead Retention]

Each adhesive composition produced as described above was extruded, on a glass plate, into a bead in a band form (length: 15 cm) with a right triangular cross section having a base of 6 mm and a height of 10 mm. Thereafter, the glass plate is erected vertically (at an angle of 90°) so that a plane to which the side having the height of 10 mm of the band-form composition belongs is horizontal and is positioned on the upper surface of the band-form composition, and the glass plate was fixed. The glass plate was left standing under conditions of 20° C. and 65% relative humidity for 30 minutes while being held vertically.

The distance h (mm) by which the vertex of the right triangle of each adhesive composition hangs down in 30 minutes after the glass plate was set vertical was measured, and the triangular bead retention was evaluated using this value.

Evaluation Criteria of Triangular Bead Retention

When the distance h measured as described above was 2 mm or less, the triangular bead retention was evaluated to be excellent, and this was indicated as "o".

On the other hand, when the distance h exceeded 2 mm, the triangular bead retention was evaluated to be poor, and this was indicated as "x".

[Deep Curability]

A polyethylene frame (size of the inside of the frame: 50 mm×50 mm×12.5 mm) was prepared, and each adhesive composition produced as described above was poured into the frame up to the height of the inside of the frame such that air bubbles did not enter the adhesive composition, and the surface of the adhesive composition in contact with the atmosphere at the upper end was flattened to prepare a test specimen. This test specimen was placed at 23° C. and a humidity of 50% for 60 hours.

The central portion of the test specimen after a lapse of 60 hours was cut perpendicularly to the surface (surface facing air) of the upper end in contact with the atmosphere, an uncured portion of the adhesive composition was removed, and the cross section of the obtained cured product was visually observed.

Evaluation Criteria for Deep Curability

When the entire cross section of the cured product was cured, the cured product was evaluated to have excellent deep curability, and this was indicated as "a".

On the other hand, when there was an uncured portion in the cross section, the cured product was evaluated to have poor deep curability, and this was indicated as "x".

[Foaming Property During Curing]

Each of the adhesive compositions produced as described above was applied, in a bead with a triangular cross section having a base of 8 mm and a height of 12 mm, with a length of 15 mm, onto one of two glass plates coated with a primer for glass (product name: Hamatite G (MS-90)). The remaining one glass plate was overlaid thereon, and pressure-bonded so that the adhesive composition had a thickness of 3 mm. The resultant was left to stand at 20° C., thereafter under 65% RH for three hours, then immersed in warm water at 40° C. for 72 hours, and taken out, and then dried for one hour. This was used as a test specimen to confirm whether there was an air pool at the adhesion interface or inside the adhesive. When there was no air (foaming), the foaming property during curing was evaluated to be good, and this was indicated as "o". When there was air, the foaming property during curing was evaluated to be poor, and this was indicated as "x".

[Stability During Use: Constant Flow Pump Exothermicity]

Each adhesive composition produced as described above was subjected to an operation (test conditions: piping pressure 20 MPa, rotation speed=1000 times/min) with a constant flow pump (trochoid pump produced by Yokohama Giken Kabushiki Kaisha) for 6 hours, and then the temperature of the pump surface was measured.

Evaluation Criteria of Stability During Use

When the temperature measured as described above was 60° C. or lower, the adhesive composition was evaluated to have excellent stability during use, and this was indicated as "o".

On the other hand, when the temperature measured as described above was over 60° C., the adhesive composition was evaluated to have poor stability during use, and this was indicated as "x".

The above results are shown in the "Constant flow pump exothermicity" row.

[Physical Properties (Initial and after Aging) of Obtained Cured Product]

In the present technology, when the tensile elastic modulus described below was 1.2 MPa or more, the elongation at break was 200% or more, and the shear strength retention after aging was 60% or more, the cured product obtained from the adhesive composition was evaluated to have excellent physical properties.

On the other hand, when the tensile elastic modulus was less than 1.2 MPa, when the elongation at break was less than 200%, or when the shear strength retention after aging was less than 60%, the cured product obtained from the adhesive composition was evaluated to have poor physical properties.

<Evaluation of Tensile Elastic Modulus and Elongation at Break>

(Preparation of Sample for Evaluation of Tensile Elastic Modulus and Elongation at Break)

Each adhesive composition produced as described above was cured for 336 hours under the conditions of 20° C. and 65% RH, and a sample was cut out in a dumbbell shape No. 3 from the obtained cured product to prepare a sample having a thickness of 2 mm.

(Tensile Test)

Using the samples prepared as described above, a tensile test was conducted at a tensile speed of 500 mm/min under the condition of 23° C. in accordance with JIS K 6251, and the tensile elastic modulus (unit: MPa) and the elongation at break (unit: %) were measured. The tensile elastic modulus was calculated from two points of stress of 10 N and 20 N.

Tensile Elastic Modulus

When the tensile elastic modulus was 1.2 MPa or more, the obtained cured product was evaluated to have high hardness, that is, high rigidity, and be preferable.

On the other hand, when the tensile elastic modulus was less than 1.2 MPa, the obtained cured product was evaluated to have low hardness.

Elongation at Break

When the elongation at break was 200% or more, the obtained cured product was evaluated to have excellent elongation at break. Incidentally, in Table 1, "200<" in the "Elongation at break" row indicates that the elongation at break was 200% or more.

On the other hand, when the elongation at break was less than 200%, the obtained cured product was evaluated to have poor elongation at break.

<Evaluation of Shear Strength Retention>

(Preparation of Sample for Evaluation of Shear Strength Retention)

Each adhesive composition produced as described above was applied to a glass plate (width 25 mm×length in longitudinal direction 120 mm×thickness 5 mm, treated with a primer (trade name MS-90, produced by Yokohama Rubber Co., Ltd.), and a coated plate (trade name: 0-1810, produced by Nippon Paint Co., Ltd., without primer, having the same size as that of the glass plate) was overlaid thereon so as to be 10 mm in the longitudinal direction to adjust the thickness of the adhesive composition to 5 mm. The laminate was cured at 20° C. and 65% RH for one week to obtain an initial test piece for shear strength.

Next, after the initial test piece was placed under the condition of 80° C. for two weeks, a vibration test with an amplitude of 10% and 10 Hz was further performed for one week to obtain an aged test piece.

(Measurement of Shear Strength)

The shear strength of the initial test piece and that of the aged test piece were measured under the condition of 23° C. in accordance with JIS K6850:1999 (Adhesives—Determination of tensile lap-shear strength of rigid-to-rigid bonded assemblies), and the initial shear strength and the shear strength after aging were determined.

(Evaluation Criteria of Shear Strength Retention)

The initial shear strength and the shear strength after aging described above were applied to the following equation to calculate the shear strength retention (%).

$$\text{Shear strength retention (\%)} = \text{Shear strength after aging} / \text{Initial shear strength} \times 100$$

When the shear strength retention was 60% or more, the aged cured product (aged due to heat and vibration) was evaluated to have excellent strength.

On the other hand, when the shear strength retention was less than 60%, the aged cured product was evaluated to have poor strength.

[Adhesiveness: Heat-Resistant Adhesiveness]

(Preparation of Sample for Adhesiveness Evaluation)

One plate of glass (25 mm×120 mm×5 mm, primer-treated, primer: trade name MS-90, produced by Yokohama Rubber Co., Ltd.) was prepared as an adherend. Each of the above described adhesive compositions was applied in a triangular bead having a base of 8 mm and a height of 12 mm, with a length of 10 cm, onto the glass plate at room temperature (23° C.), and was applied similarly onto a coated plate (trade name: 0-1810, produced by Nippon Paint Co., Ltd., without primer). The glass plate and the coated plate were overlaid with each other, with the adhesive composition being interposed therebetween, and were pressure-bonded so that the adhesive composition had a thickness of 3 mm. The resultant was cured at 20° C. under 65% RH for seven days. The test piece of the glass plate and the coated plate with the adhesive being cured therebetween was left to stand at 100° C. for four weeks to obtain a heat-resistant adhesive test piece.

(Manual Peeling Test)

A manual peeling test with a cutter knife was performed using the heat-resistant adhesive test piece obtained as described above.

When the entirety of an adhesive layer had cohesive failure as a result of the manual peeling test, the test piece was evaluated to have excellent adhesiveness (particularly heat-resistant adhesiveness), and this was indicated as "o".

On the other hand, when interfacial peeling was observed as a result of the manual peeling test, the test piece was evaluated to have poor adhesiveness, and this was indicated as "x".

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Urethane prepolymer 1 | | 100 | 100 | 100 | 100 | 100 | 100 | 100 | 100 | 100 | 100 |
| Carbon black 1 | DBP 28 | | | | | | | | | | |
| Carbon black A | DBP 34 | 25 | 25 | 26 | 26 | 29 | 30 | 31 | 31 | 31 | 31 |
| Carbon black 2 | DBP 42 | | | | | | | | | | |
| Carbon black 3 | DBP 72 | | | | | | | | | | |
| Carbon black B | DBP 102 | 58 | 75 | 65 | 75 | 57 | 73 | 56 | 62 | 68 | 73 |
| Carbon black 4 | DBP 115 | | | | | | | | | | |
| Calcium carbonate C | Heavy calcium carbonate | 32 | 32 | 32 | 32 | 32 | 32 | 32 | 32 | 32 | 32 |
| Plasticizer D1 | Adipic acid ester | 33 | 33 | 33 | 33 | 33 | 33 | 33 | 33 | 33 | 33 |
| Plasticizer D2 | Phthalic acid ester | 7 | 7 | 7 | 7 | 7 | 7 | 7 | 7 | 7 | 7 |
| Total amount of plasticizers (D) | | 42.7 | 42.7 | 42.7 | 42.7 | 42.7 | 42.7 | 42.7 | 42.7 | 42.7 | 42.7 |
| Modified product E1 | Biuret | 11 | 11 | 11 | 11 | 11 | 11 | 11 | 11 | 11 | 11 |
| Modified product E2 | Isocyanurate | | | | | | | | | | |
| Catalyst + plasticizer D3 | | 3 | 3 | 3 | 3 | 3 | 3 | 3 | 3 | 3 | 3 |
| | a + 3b | 199 | 250 | 221 | 251 | 200 | 249 | 199 | 217 | 235 | 250 |
| Thermal stability during production | Heat generation during mixing: 100° C. or lower | ○ | ○ | ○ | ○ | ○ | ○ | ○ | ○ | ○ | ○ |
| Workability during use | Viscosity 55-85 | 55 | 84 | 76 | 85 | 70 | 83 | 65 | 74 | 80 | 84 |
| | Triangular bead retention: 2 mm or less | ○ | ○ | ○ | ○ | ○ | ○ | ○ | ○ | ○ | ○ |
| | Deep curability: no uncured portion after 60 h | ○ | ○ | ○ | ○ | ○ | ○ | ○ | ○ | ○ | ○ |
| | Foaming property during curing: 3 h→warm water at 40° C. | ○ | ○ | ○ | ○ | ○ | ○ | ○ | ○ | ○ | ○ |
| Physical properties of obtained cured product | Tensile elastic modulus (MPa): 1.2 MPa or more | 1.4 | 1.9 | 1.6 | 1.9 | 15 | 1.9 | 1.5 | 1.6 | 1.7 | 1.8 |
| Adhesiveness | Heat-resistant adhesiveness 100° C. × 4 W | ○ | ○ | ○ | ○ | ○ | ○ | ○ | ○ | ○ | ○ |
| Physical properties of obtained cured product | Elongation at break(%) 200% or more | 200< | 200< | 200< | 200< | 200< | 200< | 200< | 200< | 200< | 200< |
| | Shear strength retention (%) | 68 | 65 | 74 | 72 | 77 | 74 | 75 | 78 | 82 | 75 |
| Stability during use | Constant flow pump exothermicity: no heat generation | ○ | ○ | ○ | ○ | ○ | ○ | ○ | ○ | ○ | ○ |

| | | Examples | | | | | | | | | | |
|---|---|---|---|---|---|---|---|---|---|---|---|---|
| | | 11 | 12 | 13 | 14 | 15 | 16 | 8 | 17 | 18 | 8 | 19 |
| Urethane prepolymer 1 | | 100 | 100 | 100 | 100 | 100 | 100 | 100 | 100 | 100 | 100 | 100 |
| Carbon black 1 | DBP 28 | | | | | | | | | | | |
| Carbon black A | DBP 34 | 32 | 34 | 35 | 35 | 35 | 31 | 31 | 31 | 31 | 31 | 31 |
| Carbon black 2 | DBP 42 | | | | | | | | | | | |
| Carbon black 3 | DBP 72 | | | | | | | | | | | |
| Carbon black B | DBP 102 | 55 | 65 | 55 | 58 | 72 | 62 | 62 | 62 | 62 | 62 | 62 |
| Carbon black 4 | DBP 115 | | | | | | | | | | | |
| Calcium carbonate C | Heavy calcium carbonate | 32 | 32 | 32 | 32 | 32 | 30 | 32 | 35 | 32 | 32 | 32 |
| Plasticizer D1 | Adipic acid ester | 33 | 33 | 33 | 33 | 33 | 33 | 33 | 33 | 33 | 33 | 33 |
| Plasticizer D2 | Phthalic acid ester | 7 | 7 | 7 | 7 | 7 | 7 | 7 | 7 | 1 | 7 | 9 |
| Total amount of plasticizers (D) | | 42.7 | 42.7 | 42.7 | 42.7 | 42.7 | 42.7 | 42.7 | 42.7 | 36.7 | 42.7 | 44.7 |
| Modified product E1 | Biuret | 11 | 11 | 11 | 11 | 11 | 11 | 11 | 11 | 11 | 11 | 11 |
| Modified product E2 | Isocyanurate | | | | | | | | | | | |

TABLE 1-continued

| | | | | | | | | | | | | |
|---|---|---|---|---|---|---|---|---|---|---|---|---|
| Catalyst + plasticizer D3 | | 3 | 3 | 3 | 3 | 3 | 3 | 3 | 3 | 3 | 3 | 3 |
| a + 3b | | 197 | 229 | 200 | 209 | 251 | 217 | 217 | 217 | 217 | 217 | 217 |
| Thermal stability during production | Heat generation during mixing: 100° C. or lower | ○ | ○ | ○ | ○ | ○ | ○ | ○ | ○ | ○ | ○ | ○ |
| Workability during use | Viscosity 55-85 | 68 | 78 | 70 | 68 | 85 | 73 | 74 | 75 | 80 | 74 | 65 |
| | Triangular bead retention: 2 mm or less | ○ | ○ | ○ | ○ | ○ | ○ | ○ | ○ | ○ | ○ | ○ |
| | Deep curability: no uncured portion after 60 h | ○ | ○ | ○ | ○ | ○ | ○ | ○ | ○ | ○ | ○ | ○ |
| | Foaming property during curing: 3 h→warm water at 40° C. | ○ | ○ | ○ | ○ | ○ | ○ | ○ | ○ | ○ | ○ | ○ |
| Physical properties of obtained cured product | Tensile elastic modulus (MPa): 1.2 MPa or more | 1.5 | 1.7 | 1.5 | 1.5 | 1.9 | 1.6 | 1.6 | 1.7 | 1.8 | 1.6 | 1.4 |
| Adhesiveness | Heat-resistant adhesiveness 100° C. × 4 W | ○ | ○ | ○ | ○ | ○ | ○ | ○ | ○ | ○ | ○ | ○ |
| Physical properties of obtained cured product | Elongation at break (%): 200% or more | 200< | 200< | 200< | 200< | 200< | 200< | 200< | 200< | 200< | 200< | 200< |
| | Shear strength retention (%) | 77 | 79 | 64 | 65 | 63 | 78 | 78 | 75 | 70 | 78 | 67 |
| Stability during use | Constant flow pump exothermicity: no heat generation | ○ | ○ | ○ | ○ | ○ | ○ | ○ | ○ | ○ | ○ | ○ |

| | | Examples | | | | | | | | | | |
|---|---|---|---|---|---|---|---|---|---|---|---|---|
| | | 20 | 8 | 21 | 22 | 23 | 9 | 24 | 25 | 26 | 27 | 28 |
| Urethane prepolymer 1 | | 100 | 100 | 100 | 100 | 100 | 100 | 100 | 100 | 100 | 100 | 100 |
| Carbon black 1 | DBP 28 | | | | | | | | | | | |
| Carbon black A | DBP 34 | 31 | 31 | 31 | 25 | 28 | 31 | 33 | 35 | 31 | 31 | 31 |
| Carbon black 2 | DBP 42 | | | | | | | | | | | |
| Carbon black 3 | DBP 72 | | | | | | | | | | | |
| Carbon black B | DBP 102 | 62 | 62 | 62 | 68 | 68 | 68 | 68 | 68 | 62 | 62 | 62 |
| Carbon black 4 | DBP 115 | | | | | | | | | | | |
| Calcium carbonate C | Heavy calcium carbonate | 32 | 32 | 32 | 32 | 32 | 32 | 32 | 32 | 32 | 32 | 32 |
| Plasticizer D1 | Adipic acid ester | 33 | 33 | 33 | 33 | 33 | 33 | 33 | 33 | 33 | | 40 |
| Plasticizer D2 | Phthalic acid ester | 7 | 7 | 7 | 7 | 7 | 7 | 7 | 7 | 7 | 40 | |
| Total amount of plasticizers (D) | | 42.7 | 42.7 | 42.7 | 42.7 | 42.7 | 42.7 | 42.7 | 42.7 | 42.7 | 42.7 | 42.7 |
| Modified product E1 | Biuret | 9 | 11 | 13 | 11 | 11 | 11 | 11 | 11 | | 11 | 11 |
| Modified product E2 | Isocyanurate | | | | | | | | | 11 | | |
| Catalyst + plasticizer D3 | | 3 | 3 | 3 | 3 | 3 | 3 | 3 | 3 | 3 | 3 | 3 |
| a + 3b | | 217 | 217 | 217 | 229 | 232 | 235 | 237 | 239 | 217 | 217 | 217 |
| Thermal stability during production | Heat generation during mixing: 100° C. or lower | ○ | ○ | ○ | ○ | ○ | ○ | ○ | ○ | ○ | ○ | ○ |
| Workability during use | Viscosity 55-85 | 75 | 74 | 76 | 78 | 79 | 80 | 81 | 83 | 73 | 83 | 59 |
| | Triangular bead retention: 2 mm or less | ○ | ○ | ○ | ○ | ○ | ○ | ○ | ○ | ○ | ○ | ○ |
| | Deep curability: no uncured portion after 60 h | ○ | ○ | ○ | ○ | ○ | ○ | ○ | ○ | ○ | ○ | ○ |
| | Foaming property during curing: 3 h→warm water at 40° C. | ○ | ○ | ○ | ○ | ○ | ○ | ○ | ○ | ○ | ○ | ○ |
| Physical properties of obtained cured product | Tensile elastic modulus (MPa): 1.2 MPa or more | 1.3 | 1.6 | 1.9 | 1.7 | 1.8 | 1.7 | 1.8 | 1.8 | 1.7 | 1.7 | 1.7 |
| Adhesiveness | Heat-resistant adhesiveness 100° C. × 4 W | ○ | ○ | ○ | ○ | ○ | ○ | ○ | ○ | ○ | ○ | ○ |
| Physical properties of obtained cured | Elongation at break (%): 200% or more | 200< | 200< | 200< | 200< | 200< | 200< | 200< | 200< | 200< | 200< | 200< |

TABLE 1-continued

| | | | | | | | | | | | | |
|---|---|---|---|---|---|---|---|---|---|---|---|---|
| product | Shear strength retention (%) | 70 | 78 | 75 | 70 | 68 | 82 | 76 | 64 | 75 | 77 | 76 |
| Stability during use | Constant flow pump exothermicity: no heat generation | ○ | ○ | ○ | ○ | ○ | ○ | ○ | ○ | ○ | ○ | ○ |

| | | Comparative Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Urethane prepolymer 1 | | 100 | 100 | 100 | 100 | 100 | 100 | 100 | 100 | 100 | 100 | 100 | 100 |
| Carbon black 1 | DBP 28 | | | | | | | | | | | | |
| Carbon black A | DBP 34 | 24 | 24 | 25 | 30 | 30 | 36 | 36 | 36 | 31 | 31 | 31 | 31 |
| Carbon black 2 | DBP 42 | | | | | | | | | | | | |
| Carbon black 3 | DBP 72 | | | | | | | | | | | | |
| Carbon black B | DBP 102 | 57 | 65 | 55 | 55 | 75 | 54 | 58 | 73 | 62 | 62 | 62 | 62 |
| Carbon black 4 | DBP 115 | | | | | | | | | | | | |
| Calcium carbonate C | Heavy calcium carbonate | 32 | 32 | 32 | 32 | 32 | 32 | 32 | 32 | 28 | 38 | 32 | 32 |
| Plasticizer D1 | Adipic acid ester | 33 | 33 | 33 | 33 | 33 | 33 | 33 | 33 | 33 | 33 | 27 | 33 |
| Plasticizer D2 | Phthalic acid ester | 7 | 7 | 7 | 7 | 7 | 7 | 7 | 7 | 7 | 7 | 0 | 12 |
| Total amount of plasticizers (D) | | 42.7 | 42.7 | 42.7 | 42.7 | 42.7 | 42.7 | 42.7 | 42.7 | 42.7 | 42.7 | 29.7 | 47.7 |
| Modified product E1 | Biuret | 11 | 11 | 11 | 11 | 11 | 11 | 11 | 11 | 11 | 11 | 11 | 11 |
| Modified product E2 | Isocyanurate | | | | | | | | | | | | |
| Catalyst + plasticizer D3 | | 3 | 3 | 3 | 3 | 3 | 3 | 3 | 3 | 3 | 3 | 3 | 3 |
| a + 3b | | 195 | 219 | 190 | 195 | 255 | 198 | 210 | 255 | 217 | 217 | 217 | 217 |
| Thermal stability during production | Heat generation during mixing: at or below 100° C. | ○ | ○ | ○ | ○ | ○ | X | X | X | ○ | ○ | X | ○ |
| Workability during use | Viscosity 55-85 | 84 | 75 | 63 | 68 | 92 | 85 | 85 | 91 | 73 | 75 | 86 | 70 |
| | Triangular bead retention: 2 mm or less | ○ | ○ | X | X | ○ | ○ | ○ | ○ | ○ | ○ | ○ | X |
| | Deep curability: no uncured portion after 60 h | ○ | ○ | ○ | ○ | ○ | ○ | ○ | ○ | X | ○ | ○ | ○ |
| | Foaming property during curing: 3 h→warm water at 40° C. | ○ | ○ | ○ | ○ | ○ | ○ | ○ | ○ | ○ | ○ | X | ○ |
| Physical properties of obtained cured product | Tensile elastic modulus (MPa): 1.2 MPa or more | 1.6 | 1.9 | 1.4 | 1.4 | 1.5 | 1.9 | 1.9 | 2.0 | 1.5 | 1.7 | 1.8 | 1.4 |
| Adhesiveness | Heat-resistant adhesiveness 100° C. × 4 W | X | X | ○ | ○ | ○ | ○ | ○ | ○ | ○ | ○ | ○ | X |
| Physical properties of obtained cured product | Elongation at break (%): 200% or more | 200< | 200< | 200< | 200< | 200< | 200< | 200< | 200< | 200< | 190 | 200< | 200< |
| | Shear strength retention (%) | 65 | 68 | 64 | 74 | 73 | 62 | 60 | 60 | 77 | 75 | 70 | 68 |
| Stability during use | Constant flow pump exothermicity: no heat generation | ○ | ○ | ○ | ○ | ○ | ○ | ○ | ○ | ○ | X | ○ | ○ |

| | | Comparative Examples | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Urethane prepolymer 1 | | 100 | 100 | 100 | 100 | 100 | 100 | 100 | 100 | 100 | 100 | 100 | 100 |
| Carbon black 1 | DBP 28 | | | | | | 31 | | | | | | |
| Carbon black A | DBP 34 | 31 | 31 | 95 | 31 | 34 | | | 31 | 31 | 26 | 32 | 27 |
| Carbon black 2 | DBP 42 | | | | | | | 31 | | | | | |
| Carbon black 3 | DBP 72 | | | | | | | | 62 | | | | |
| Carbon black B | DBP 102 | 62 | 62 | 20 | 80 | 54 | 62 | 62 | | | 76 | 74 | 56 |
| Carbon black 4 | DBP 115 | | | | | | | | | 62 | | | |
| Calcium carbonate C | Heavy calcium carbonate | 32 | 32 | 18 | 32 | 32 | 32 | 32 | 32 | 32 | 32 | 32 | 32 |
| Plasticizer D1 | Adipic acid ester | 33 | 33 | 33 | 33 | 33 | 33 | 33 | 33 | 33 | 33 | 33 | 33 |
| Plasticizer D2 | Phthalic acid ester | 7 | 7 | 7 | 7 | 7 | 7 | 7 | 7 | 7 | 7 | 7 | 7 |
| Total amount of plasticizers (D) | | 42.7 | 42.7 | 42.7 | 42.7 | 42.7 | 42.7 | 42.7 | 42.7 | 42.7 | 42.7 | 42.7 | 42.7 |
| Modified product E1 | Biuret | 7 | 14 | 11 | 11 | 11 | 11 | 11 | 11 | 11 | 11 | 11 | 11 |
| Modified product E2 | Isocyanurate | | | | | | | | | | | | |

TABLE 1-continued

| | | | | | | | | | | | | | |
|---|---|---|---|---|---|---|---|---|---|---|---|---|---|
| Catalyst + plasticizer D3 | | 3 | 3 | 3 | 3 | 3 | 3 | 3 | 3 | 3 | 3 | 3 | 3 |
| a + 3b | | 217 | 217 | 155 | 271 | 196 | 186 | 186 | 31 | 31 | 254 | 254 | 195 |
| Thermal stability during production | Heat generation during mixing: at or below 100° C. | ○ | ○ | X | ○ | ○ | X | ○ | ○ | ○ | ○ | ○ | ○ |
| Workability during use | Viscosity 55-85 | 76 | 73 | 83 | 91 | 59 | 59 | 66 | 57 | 89 | 89 | 87 | 60 |
| | Triangular bead retention: 2 mm or less | ○ | ○ | ○ | X | X | ○ | ○ | X | ○ | ○ | ○ | X |
| | Deep curability: no uncured portion after 60 h | ○ | ○ | ○ | ○ | ○ | ○ | ○ | ○ | ○ | ○ | ○ | ○ |
| | Foaming property during curing: 3 h→warm water at 40° C. | ○ | X | ○ | ○ | ○ | ○ | ○ | X | ○ | ○ | ○ | ○ |
| Physical properties of obtained cured product | Tensile elastic modulus (MPa): 1.2 MPa or more | 1.0 | 2.5 | 2.0 | 1.6 | 1.4 | 1.4 | 1.4 | 1.4 | 1.4 | 1.3 | 1.4 | 1.4 |
| Adhesiveness | Heat-resistant adhesiveness 100° C. × 4 W | X | ○ | ○ | ○ | ○ | ○ | X | ○ | ○ | ○ | ○ | ○ |
| Physical properties of obtained cured product | Elongation at break (%): 200% or more | 200< | 180 | 150 | 190 | 200< | 190 | 200< | 190 | 200< | 200< | 200< | 200< |
| | Shear strength retention (%) | 73 | 69 | 51 | 70 | 68 | 62 | 65 | 70 | 65 | 74 | 73 | 72 |
| Stability during use | Constant flow pump exothermicity: no heat generation | ○ | ○ | ○ | ○ | ○ | ○ | ○ | ○ | ○ | ○ | ○ | ○ |

Details of each component shown in Table 1 are as follows.

[Urethane Prepolymer]

Urethane prepolymer 1: each urethane prepolymer 1 prepared as described above

[Carbon Black]

Carbon black 1: trade name: Asahi Thermal, produced by Asahi Carbon Co., Ltd., DBP oil absorption number: 28 ml/100 g, FT grade Incidentally, the carbon black 1 does not correspond to any of the carbon blacks A and B. The same applies to the carbon blacks 2 to 4 described below.

Carbon black A: trade name: CSX 682, produced by Cabot Specialty Chemicals, Inc., DBP oil absorption number: 34 ml/100 g Carbon black 2: trade name: SEAST TA, produced by Tokai Carbon Co., Ltd., DBP oil absorption number: 42 ml/100 g Carbon black 3: trade name: HTC #S, produced by Nippon Steel Carbon Co., Ltd., DBP oil absorption number: 72 ml/100 g Carbon black B: trade name: ELFTEX460, produced by Cabot Specialty Chemicals, Inc., DBP oil absorption number: 102 ml/100 g Carbon black 4: trade name: NITERON #300, produced by Nippon Steel Chemical Carbon Co., Ltd., DBP oil absorption number: 115 ml/100 g, ISAF grade

[Calcium Carbonate C]

Calcium carbonate C: heavy calcium carbonate cumulative 50% particle diameter: 8.5 (Super S, produced by Maruo Calcium Co., Ltd.), surface untreated

[Plasticizer D]

Plasticizer D1: Diisononyl Adipate (DINA)

Plasticizer D2: diisononyl phthalate (DINP)

[Modified Product E]

Modified product E1: HDI biuret represented by the above formula (7) (D165N, produced by Mitsui Takeda Chemicals, Inc.)

Modified product E2: HDI isocyanurate product represented by the above formula (8) (D170N, produced by Mitsui Takeda Chemicals, Inc.)

Catalyst+plasticizer D3: mixture of a catalyst of (9) to (12) and a plasticizer D3 of (13) shown below (3 parts by mass in total)

(9) Dioctyltin dilaurate: 0.01 parts by mass of NEOSTANN 810 (Nitto Kasei Co., Ltd.)

(10) Bis(2,2-morpholinoethyl)ether: 0.12 parts by mass of DMDEE (Huntsman Corporation)

(11) Bis(dimethylaminoethyl)ether: 0.05 parts by mass of BL-19 (Evonik Industries)

(12) Dimethylaminoethylmorpholine: 0.1 parts by mass of X-DM (Evonik Industries)

(13) Plasticizer D3:2.72 parts by mass of diisononyl phthalate (DINP)

As is apparent from the results shown in Table 1, in Comparative Examples 1 and 2, in which at least "a" was less than the predetermined range, the adhesiveness (heat-resistant adhesiveness) was poor.

In Comparative Examples 3 to 5, in which "a+3b" was out of the predetermined range, the workability during use (viscosity or triangular bead retention) was poor.

In Comparative Example 6 to 8, in which at least "a" was more than the predetermined range, the thermal stability during production and the like were poor.

In Comparative Example 9, in which "c" was less than the predetermined range, the workability during use (deep curability) was poor.

In Comparative Example 10, in which "c" was more than the predetermined range, the obtained cured product had poor physical properties (elongation at break) and poor stability during use.

In Comparative Example 11, in which "d" was less than the predetermined range, the thermal stability during production and the workability during use (viscosity, foaming property during curing) were poor.

In Comparative Example 12, in which “d” was more than the predetermined range, the workability during use (triangular bead retention) and the adhesiveness (heat-resistant adhesiveness) were poor.

In Comparative Example 13, in which “e” was less than the predetermined range, the obtained cured product had poor physical properties (tensile elastic modulus) and adhesiveness (heat-resistant adhesiveness).

In Comparative Example 14, in which “e” was more than the predetermined range, the workability during use (foaming property during curing) was poor, and the obtained cured product had poor physical properties (elongation at break).

In Comparative Example 15, in which “a”, “b”, and “a+3b” were out of the predetermined ranges, the thermal stability during production was poor, and the obtained cured product had poor physical properties (elongation at break, shear strength retention).

In Comparative Examples 16 and 17, in which “b” and “a+3b” were out of the predetermined ranges, the workability during use (triangular bead retention) and the like were poor.

In Comparative Example 18, in which the carbon black A was not contained but instead the carbon black 1 having a DBP oil absorption number lower than that of the carbon black A was contained, the thermal stability during production was poor, and the obtained cured product had poor physical properties (elongation at break).

In Comparative Example 19, in which the carbon black A was not contained but instead the carbon black 2 having a DBP oil absorption number slightly larger than that of the carbon black A was contained, the adhesiveness (heat-resistant adhesiveness) was poor.

In Comparative Example 20, in which the carbon black B was not contained but instead the carbon black 3 having a DBP oil absorption number slightly smaller than that of the carbon black B was contained, the workability during use (triangular bead retention, foaming property during curing) were poor, and the obtained cured product had poor physical properties (elongation at break).

In Comparative Example 21, in which the carbon black B was not contained but instead the carbon black 4 having a DBP oil absorption number larger than that of the carbon black 13 was contained, the workability during use (viscosity) was poor.

In Comparative Example 22, in which “b” was out of the predetermined range and “a+3b” was larger than the predetermined range, and in Comparative Example 23, in which “a+3b” was larger than the predetermined range, workability during use (viscosity) was poor.

In Comparative Example 24, in which “a+3b” was smaller than the predetermined range, the workability during use (triangular bead retention) was poor.

In contrast, the urethane-based adhesive composition of the present technology was excellent in thermal stability during production, workability and stability during use, and physical properties of a cured product to be obtained, and adhesiveness.

The invention claimed is:

1. A urethane-based adhesive composition comprising:

a urethane prepolymer;

a carbon black A having a dibutyl phthalate oil absorption number of 30 to 40 ml/100 g;

a carbon black B having a dibutyl phthalate oil absorption number of 98 to 108 ml/100 g;

a calcium carbonate C;

a plasticizer D;

a modified product E of an aliphatic diisocyanate; and a catalyst, the urethane-based adhesive composition being configured to satisfy all of the following (1) to (6):

$$25 \leq a \leq 35 \quad (1)$$

$$55 \leq b \leq 75 \quad (2)$$

$$197 \leq a+3b \leq 251 \quad (3)$$

$$32 \leq c < 35 \quad (4)$$

$$35 \leq d \leq 45 \quad (5)$$

$$9 \leq e \leq 13 \quad (6)$$

where “a” in the (1) and (3) represents a content of the carbon black A with respect to 100 parts by mass of the urethane prepolymer, “b” in the (2) and (3) represents a content of the carbon black B with respect to 100 parts by mass of the urethane prepolymer, “c” in the (4) represents a content of the calcium carbonate C with respect to 100 parts by mass of the urethane prepolymer, “d” in the (5) represents a content of the plasticizer D with respect to 100 parts by mass of the urethane prepolymer, “e” in the (6) represents a content of the modified product E with respect to 100 parts by mass of the urethane prepolymer, and units of the “a” to “e” are parts by mass.

2. The urethane-based adhesive composition according to claim 1, wherein the modified product E contains a biuret of hexamethylene diisocyanate and/or an isocyanurate of hexamethylene diisocyanate.

3. The urethane-based adhesive composition according to claim 1, wherein the calcium carbonate C contains heavy calcium carbonate.

4. The urethane-based adhesive composition according to claim 1, wherein the plasticizer D contains a phthalic acid ester and/or an adipic acid ester.

* * * * *